United States Patent [15] 3,695,097
Michalowicz [45] Oct. 3, 1972

[54] DEDUCTOR FOR FLOW METERING SYSTEM AND APPARATUS
[72] Inventor: Joseph C. Michalowicz, 7904 Wyndale Road, Chevy Chase, Md. 20015
[22] Filed: March 2, 1970
[21] Appl. No.: 15,578

[52] U.S. Cl. ................................................. 73/113
[51] Int. Cl. ............................................. G01l 3/26
[58] Field of Search .................. 73/113, 112; 180/77

[56] References Cited

UNITED STATES PATENTS 3,252,322  5/1966  Pring ........................... 73/113
3,332,283  7/1967  Michalowicz ................ 73/113
3,369,394  2/1968  Higgs ........................... 73/113
3,512,600  5/1970  Adams ......................... 180/77

OTHER PUBLICATIONS

Sales Brochure–" Fuel–O–Meter" Columbia Systems, Portland, Ore.

Primary Examiner—Richard C. Queisser
Assistant Examiner—Marvin Smollar
Attorney—Strauch, Nolan, Neale, Nies and Kurz

[57] ABSTRACT

A flow consumption metering system and apparatus employing a flow meter and a mechanism (hereinafter called a deductor) in the flow supply line from a source to a point of use and a return line for recirculating any unused portion of the flow for reuse to the deductor so as to avoid a further metering of the unused portion of the flow.

4 Claims, 4 Drawing Figures

INVENTOR
JOSEPH C. MICHALOWICZ

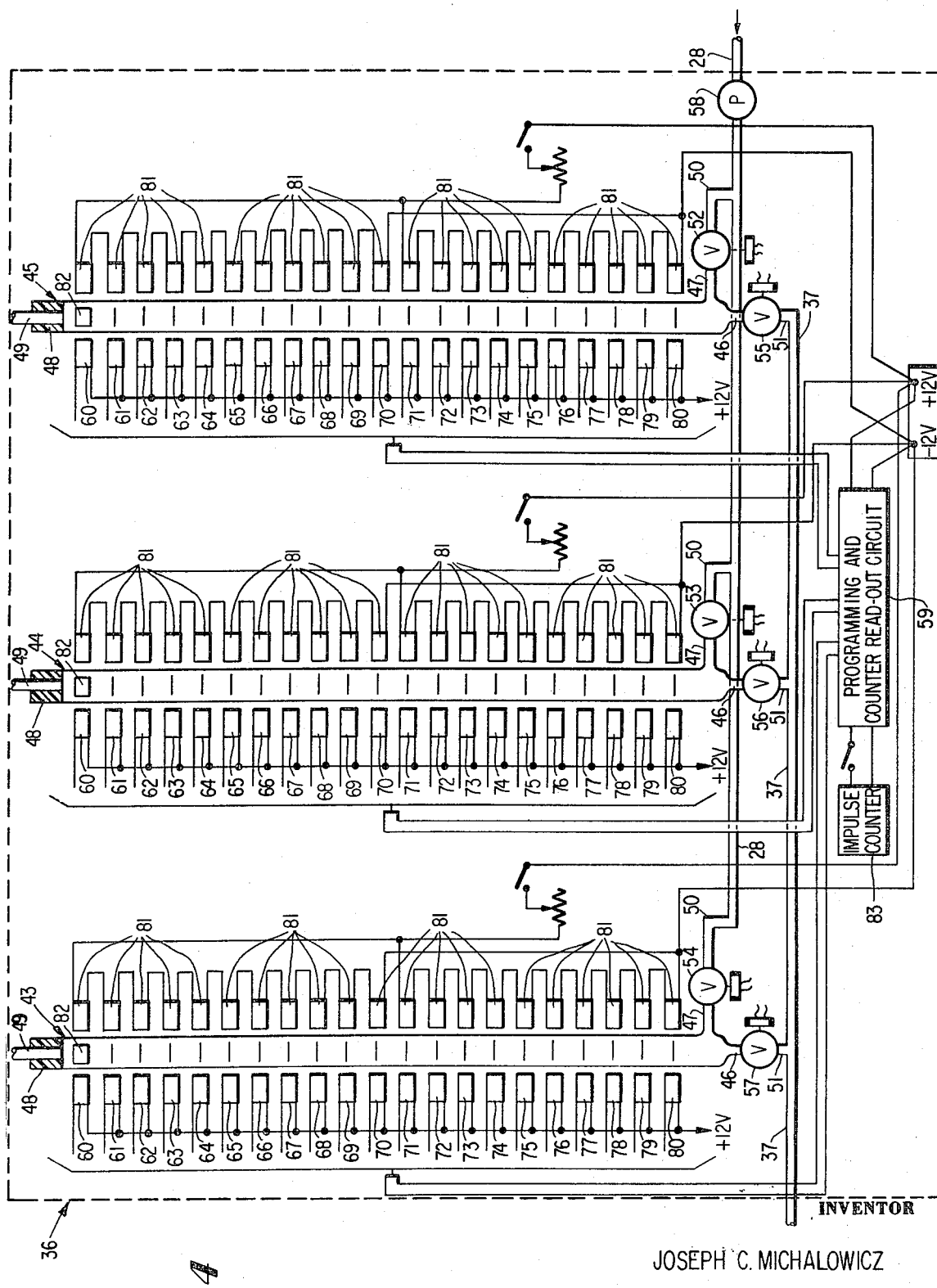

DEDUCTOR FOR FLOW METERING SYSTEM AND APPARATUS

BACKGROUND OF THE INVENTION

In the making of operating cost studies in flow consumption systems such as the fuel systems of motor vehicles, it is necessary to have accurate fuel consumption data. The metering systems and devices heretofore provided, except for that disclosed and claimed in applicant's U.S. Pat. No. 3,332,283, issued July 25, 1967 and entitled, Fluid Metering System and Apparatus, lack the required reliability and accuracy for measuring the actual fuel consumption under the wide variations of flow conditions and vehicle and road conditions necessary in such studies. This is particularly true where the sections of roadways chosen for study sites are short lengths and the fuel consumption necessary to travel the full length is less than one-tenth of a gallon and the vehicle being tested employs a diesel engine power plant. In such power plants, the fuel system typically consists of a fuel supply line extending from the fuel tank and containing in sequence a primary filter, an engine driven fuel pump, a secondary filter having a constant bleed line leading to a fuel return line leading to the fuel tank, a fuel distribution head having an outlet supply line leading to the fuel injectors which include internal fuel return passages communicating with a bypass line for carrying unburned fuel to the return line to the fuel tank and a second outlet to return the pump overflow delivered to the distribution head to the return line to the fuel tank. In such diesel engine fuel systems, approximately two-thirds of the fuel passing through the fuel pump is returned to the fuel tank and is not actually used or consumed. To provide an accurate determination of the actual used or consumed fuel in such systems, it is essential to deduct this unused fuel from the total amount of fuel withdrawn from the fuel tank and to accurately meter or measure the fuel actually consumed by the engine.

SUMMARY OF THE INVENTION

The present invention accomplishes this end by providing a mechanism, which will hereinafter be referred to as a "deductor," in conjunction with a highly accurate fuel metering device of the type disclosed in applicant's above mentioned patent which is capable of accurately measuring the liquid fuel actually delivered and consumed without interrupting the flow of the liquid fuel supplied to the point of usage, namely, the injectors which are conventionally provided with fuel return passages as heretofore pointed out. To this end, the metering device is interposed in the supply line upstream from the deductor which is provided with a main fuel inlet directly connected to the outlet connection of the metering device. The deductor includes a secondary fuel inlet which is directly connected through a return fuel bypass line and diverter valve inserted in the conventional fuel return line to divert the return fuel flow from the fuel tank directly to the deductor so that the return fuel flow does not pass again through the metering device.

It, accordingly, is a primary object of this invention to provide a continuous flow, precision fuel consumption measuring system for diesel engine driven motor vehicles.

A further important object of the present invention resides in the provision of continuous flow, precision fuel consumption measuring apparatus for diesel engine motor vehicles which automatically deducts the unconsumed returned fuel flow thereby assuring a more accurate operating cost study of diesel engine motor vehicles.

A still further object of the present invention resides in the provision of a continuous flow, precision fuel consumption apparatus for diesel engine motor vehicles which is capable of accurately measuring incremental volumes of fuel consumption in conducting operating studes over roadway test sites of widely varying length including short roadway sections involving the consumption of less than one-tenth of a gallon of fuel.

Still another object of the present invention resides in the provision of a simple, compact, rugged fuel deductor mechanism for use in conducting fuel consumption measurements of diesel engine driven motor vehicles.

BRIEF DESCRIPTION OF THE DRAWINGS

Further objects will appear from the following description and appended claims when read in conjunction with the accompanying drawings wherein:

FIG. 4 is a schematic view in elevation of a fuel consumption metering system and apparatus of the type shown and described in applicant's aforementioned Letters Patent preferably employed to assure the high accuracy measurement of the consumed fuel in accord with this invention.

DESCRIPTION OF THE PREFERRED EMBODIMENT OF THE INVENTION

Figure 1:
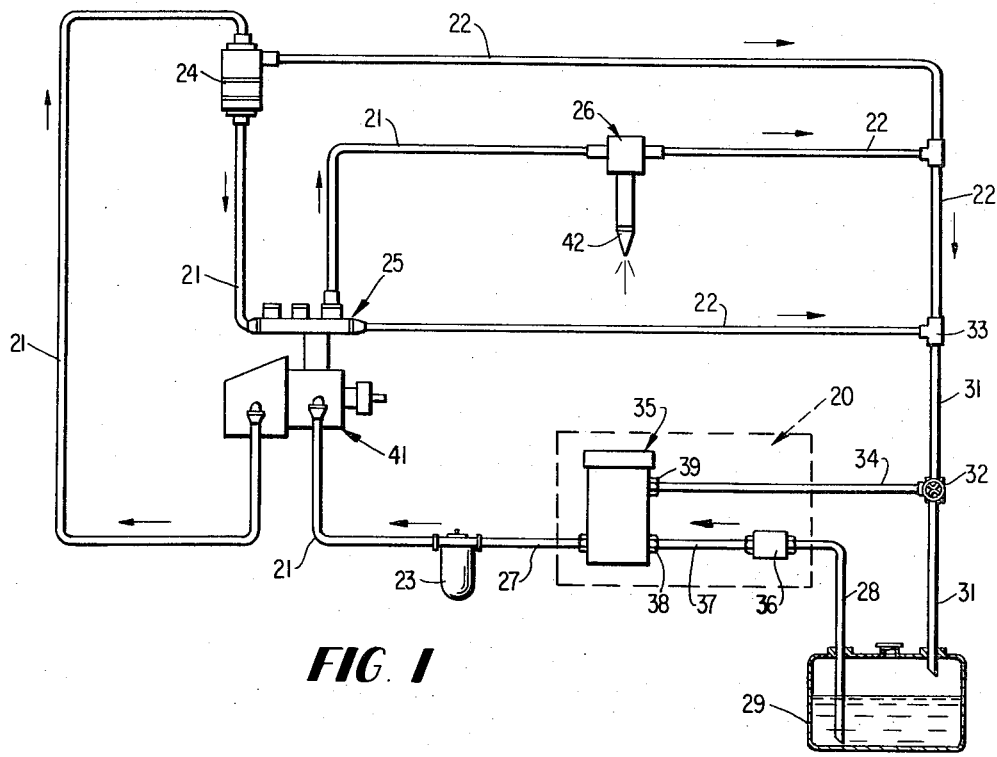
FIG. 1 is a diagrammatic view illustrating a typical diesel engine motor vehicle fuel supply system with the deductor and fuel consumption meter of this invention installed therein.

With continued reference to the drawings wherein the same reference numerals are employed throughout the several views of the drawings to designate the same parts, numeral 20 generally designates the deductor and fuel consumption metering assembly of this invention preferably housed in a common housing fitted for unitary incorporation into the main supply and return lines 21 and 22 of a typical diesel engine fuel system wherein the return line 22 is a multi-branch line providing return paths from the secondary filter 24, the fuel distribution head 25, and the fuel injector assembly 26. As clearly appears from FIG. 1, deductor and fuel consumption meter assembly 20 is provided with fuel supply line connections 27 and 28 replacing that portion of the conventionally provided supply line 21 between the fuel tank 29 and primary filter 23 and a multi-branch fuel return line connection including a run 31 including a three-way valve 32 replacing that portion of the conventionally provided fuel return line between T connection 33 and the fuel tank 29 and a pipe line run 34 extending from valve 32 to the deductor 35 of assembly 20. Supply line 28 at its end downstream from fuel tank 29 is connected to the inlet of a fuel consumption meter 36 which preferably comprises the type of meter of applicant's aforesaid patent. The outlet of fuel consumption meter 36 is connected through a pipe line 37 to the primary fuel inlet 38 of deductor 35 and the pipe line run 34 of the multi-branch fuel return line connection of this invention is connected to a secondary fuel inlet 39 of deductor 35.

In operation of the fuel consumption measuring system of this invention, valve 32 is set to direct the conventional return flow of fuel through pipe line run 34 to the secondary fuel inlet 39 establishing a fuel flow path from fuel tank 29, through fuel supply line 28, fuel consumption meter 36 and pipe line 37 to primary fuel inlet 38 of deductor 35, from deductor 35 through fuel supply line 27 and primary filter 23 to conventional fuel supply line 21 at the outlet connection of primary filter 23. The fuel then passes conventionally along fuel supply line 21 and in succession through the conventional main fuel pump 41 which discharges the fuel under high pressure forcing it through secondary filter 24, fuel distributor head 25 and fuel injector assembly 26 where it is atomized through small spray tip orifices designated by numeral 42 into the combustion chambers of the engine (not shown). In passing through secondary filter 24 under pressure, a portion of the supplied fuel is bled into fuel return line 22 and the remainder, a volume in excess of that to be delivered from fuel distributor head 25 to injector assembly 26, is divided to supply the requirements of the injector assembly 26 at the varying engine operating speeds with the excess flow passing into return line 22. Additionally injector assembly 26 and the engine cylinders are conventionally provided with return fuel passages receiving fuel which is not burnt in the cylinders and directing the unburnt fuel into return line 22. This unconsumed fuel from these various points in the conventional diesel engine fuel system flows from fuel return line 22 through valve 32 and pipe line 34 into deductor 35 from where it is recirculated through primary filter 23 and fuel supply line 21 and again supplied for consumption but without passing a second time through fuel consumption meter 36.

Figure 3:
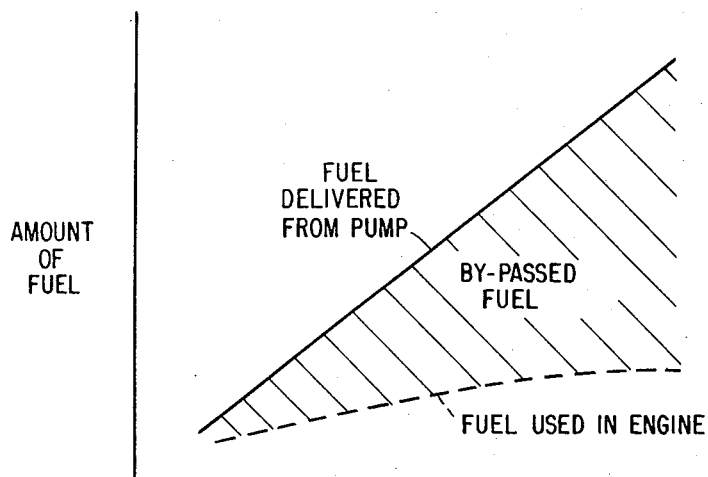
FIG. 3 is a graph plotting the amount of fuel against engine speed to show how the curve representing fuel consumed or used in a typical diesel engine compares to the fuel actually delivered by the fuel pump of the engine.

It will be apparent, therefore, that the fuel supply system, including the deductor and fuel consumption meter assembly 20 of this invention, provides a system in which the fuel passing from fuel tank 29 is metered once only and will continue to be recirculated in a circuit by passing fuel consumption meter 36 until it is consumed by the engine. The volume of recirculated fuel, as will appear from an inspection of FIG. 3, is the sectioned area between the straight solid line representing the amount of fuel delivered from pump 41 at varying progressively increasing engine speeds and the dotted curve representing the amount of delivered fuel actually consumed at the varying progressively increasing engine speeds, a substantial quantity. As a matter of fact, test data accurately developed shows that the volume of fuel normally recirculated in such diesel engine driven motor vehicle fuel systems approximates two-thirds of the total volume supplied by pump 41 from fuel tank 29.

It follows, therefore, that accurate measurement of the fuel consumed by a diesel engine driven vehicle not only necessitates metering of the fuel withdrawn from fuel tank 29 but also requires either an accurate determination of the fuel returned from the engine and its fuel supply system and a mathematical computation to determine the quantity actually consumed or accurate measurement of only that portion of the supplied fuel which is actually consumed. The system of the present invention utilizing the deductor-fuel consumption meter assembly 20 of the present invention provides accurate measurement of only the consumed portion of the fuel delivered. It does so since the previously measured returned fuel is always sufficient to maintain the fuel supply line filled so that an instantaneous reading of the single meter indication at the start and at the finish of a selected test course will provide a volumetric measurement of only the quantity of fuel required to replenish the volume of fuel which is not returned to deductor 35, i.e., the actual fuel consumed between the two readings.

Figure 2:
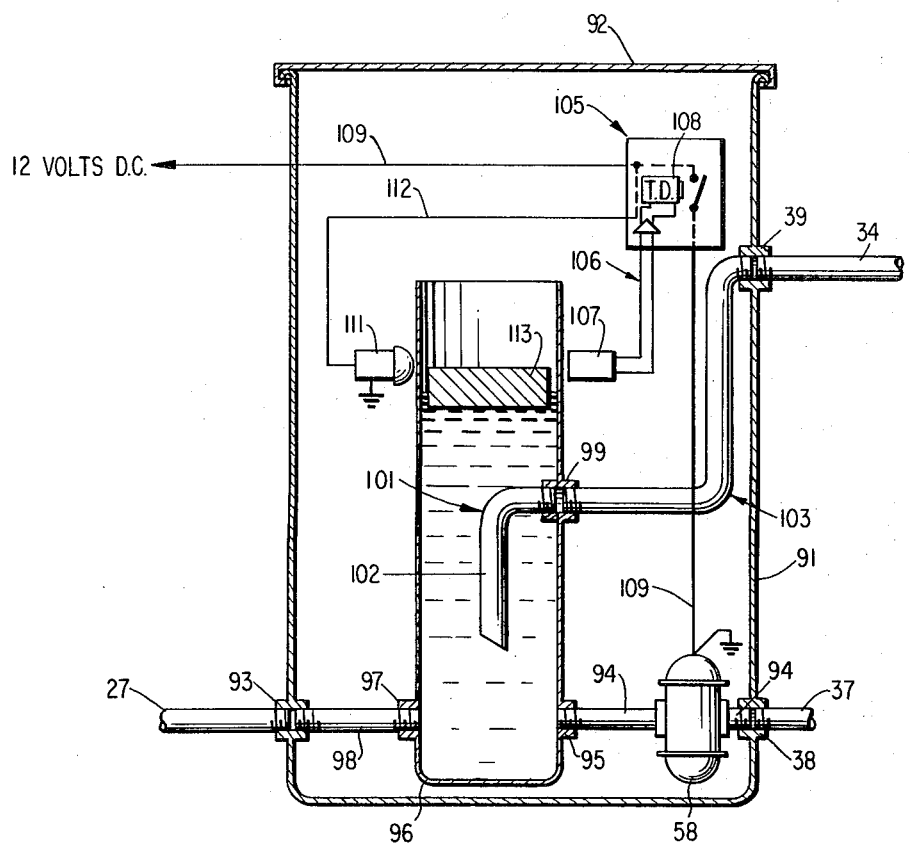
FIG. 2 is a vertical sectional view of the deductor of FIG. 1.

The details of the apparatus employed to effectuate the novel measuring system of this invention are shown in FIGS. 2 and 4 of the drawings. Referring first to FIG. 4, the consumption meter 36, depicted schematical in FIG. 4 and fully described and claimed in applicant's aforementioned United States Letters Patent, comprises a plurality of burettes 43, 44 and 45 which are mounted in upstanding, parallel relation on a suitable support panel (not shown) and provide respective volumetric measuring chambers. Burettes 43, 44 and 45 are of conventional, graduated glass tube construction of preferably equal volumetric capacity. Each burette is formed with a bottom outlet port 46, a side inlet port 47 and an open upper end stoppered by a respective cork stopper 48 having a centered through bore fitted with tubes 49 providing overflow outlets for the respective chambers in event of defective operation of the filling and emptying valves to be presently described.

The respective inlet ports 47 are connected in parallel to fluid supply line 28 leading from fuel tank 29 by conduits 50 while the respective outlet ports 46 are connected in parallel to fluid pipe line 37 leading from fuel consumption meter 36 to deductor 35 by conduits 51. Solenoid operated valves 52, 53 and 54 are respectively disposed in the conduits 50 leading to burettes 45, 44 and 43 and similar solenoid operated valves 55, 56 and 57 respectively are disposed in the conduits 51 leading to the supply line 37 of deductor 35. These solenoid valves respectively control the flow of fuel to the burettes and the flow of fuel from the burettes. A fuel pump 58 disposed in fuel supply line 28 is employed to supply fuel to burettes 43, 44 and 45 which are sequentially filled and emptied by gravity flow, as more fully explained in the aforesaid Letters Patent, to maintain a continuous supply of fuel in fuel supply line 37.

Consumption meter 36 includes a programming and counter read-out circuit 59 for controlling the filling and emptying of the burettes and metering the volume of fuel passing from fuel supply line 28 to supply line 37. This circuit is responsive to the sensing of the changes in the height of the liquid columns of burettes 43, 44 and 45 effected through detecting apparatus comprising a series of suitable, conventional photocells 60, 61, 62, 63, 64, 65, 66, 67, 68, 69, 70, 71, 72, 73, 74, 75, 76, 77, 78, 79, and 80 arranged in vertically spaced apart relation along one side of each of burettes 43, 44, and 45 to detect equal volume changes in height of fuel in the respective burettes indicated by the interruption of the respective light beams from oppositely related light sources 81 as an opaque cylindrical float 82 individual to the respective burettes falls with the liquid level. When float 82 interrupts the light beam directed to photocell 60 of the respective burettes during the filling cycle, the respective filling inlet valves 52, 53 and 54 are closed and when the float 82 interrupts the light beam directed to photocell 80 of the respective burettes during the emptying cycle the respective outlet valves 55, 56 and 57 are closed. Programming is such that each beam interruption during the emptying cycle of each burette effects a unit counting operation of an impulse counter 83. The programming and operational details of read-out circuit 59 and impulse counter 83 are fully disclosed in applicant's aforesaid Letters Patent to which reference may be made for further details. It is sufficient to say that since the photocells and their respective energizing light sources are spaced to assure light beam interruptions for equal volume increments of dispensed fuel, the impulse counter readings at the start and finish of a test run will indicate the total number of predetermined equal volume increments of dispensed fuel during a particular test run. By varying the number of photocells employed, the volume of the predetermined increments counted can be varied to increase or decrease the sensitivity of the metering apparatus. In the consumption meter of the present invention, the meter has been designed to record increments of four cubic centimeters of fuel and when used with deductor 35 provides a dependable and accurate means of measuring fuel consumption in a diesel engine to within one one-thousandth of a gallon.

Referring now to FIG. 2, deductor 35 comprises a light tight box 91 provided with a cover 92, a primary inlet fitting 38 near the bottom, a secondary inlet fitting 39 vertically spaced above inlet fitting 38, and an outlet fitting 93 preferably located near the bottom directly opposite primary inlet 37. Fuel supply pipe 37 leading from fuel consumption meter 36 is directly connected to the outer end of fitting 38, fuel supply line 27 terminating in primary filter 23 is directly connected to the outer end of an outlet fitting 93 and pipe line run 34 of the deductor multi-branch fuel return line connection is directly connected to the outer end of fitting 39.

Extending from the inner end of fitting 38 is a pipe line 94 containing an independently electrically energized fuel pump 58 the free end of which is connected to a sidewall inlet fitting 95 located near the bottom of an open topped, light penetratable cylindrical fuel chamber 96. Chamber 96 diametrically opposite sidewall fitting 95 is provided with an outlet fitting 97 which is connected to the inner end of outlet fitting 93 by a pipe line 98. Fuel chamber 96 in vertically spaced relation to inlet fitting 95 is provided with a double ended pipe fitting 99 the inner end of which threadedly receives an L-shaped delivery pipe 101 the leg 102 of which is preferably directed to discharge downwardly into chamber 96. The outer end of fitting 99 is connected to the inner end of fitting 39 by a pipe line 103 for delivering returned fuel from pipe line run 34 into chamber 96 through delivery pipe 101. Pipe connections 94, 98 and 103 serve to suspend chamber 96 within light tight box 91 in upright position.

Also mounted within light tight box 91 in any suitable manner is a combined fuel pump control and photoelectric scanning device generally indicated by numeral 105. Fuel pump control and scanning device 105 comprises an amplifier circuit 106 the input of which is provided by a photo-electric sensor 107 and the output of which includes a normally open relay 108 controlling the power input to fuel pump 58 over main electric supply line 109, a light source 111 energized by a branch supply line 112, and a cylindrical opaque float 113 which rises and falls with the fuel level in chamber 96. In operation, float 113 interrupts the light beam passing from light source 111 to photo-electric sensor 107 to deenergize fuel pump 58 so long as the fuel level is maintained sufficiently high by the fuel return flow through pipe line 103. When the fuel level in chamber 96 falls sufficiently to drop float 113 below its light beam interrupting position, normally open relay 108 closes the supply circuit to fuel pump 58 and fuel is delivered by pump 58 to chamber 96 through pipe line 94 from fuel supply line 37 and the burette 43, 44 or 45 that is conditioned to supply fuel to fuel supply line 37 to raise the fuel level in chamber 96. Once the fuel level in chamber 96 is raised sufficiently to block the light beam directed to sensor 107, the electric supply line 109 to fuel pump 58 is deenergized and delivery of fuel to chamber 96 from pump 58 is discontinued. This intermittent operation of pump 58 serves to replenish only that portion of the fuel which is not returned through return line 22, 31, 34 and the replenishing fuel only is metered by consumption meter 36. To guard against "hunting" of the pump, a time delay factor is incorporated into relay 108 so that a predetermined minimum quantity of fuel will be supplied to refill chamber 96 at all times. The designation "TD" applied to FIG. 2 diagrammatically indicates this fact. Since this replenishing fuel equals in volume the non-returned fuel or consumed fuel, it follows that the apparatus just described assures a fuel consumption system of extreme reliability and accuracy for providing fuel consumption data respecting diesel engines and diesel engine driven vehicle road tests.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A precision flow measuring method for measuring the actual consumed flow at a point of use comprising the steps of establishing a flow from a source in succession through a flow consumption meter, a supply chamber maintained at a predetermined flow volume, a supply line, said point of use, and a spill return line for returning the spill at one or more points leading to said point of use directly to said chamber for recirculation to said point of use thereby avoiding a second metering of said unconsumed spill and controlling the established flow from said source through said meter to said supply chamber to replenish said supply chamber when the flow volume in said supply chamber falls below said predetermined volume whereby said meter will provide an accurate volumetric flow consumption for a given period of flow delivery.

2. Precision flow measuring apparatus for measuring the total used flow delivered from a source to a point of use through a supply line having one or more spill points ahead of the point of use and a return line for recirculating the flow spilled ahead of the point of use comprising a flow consumption meter interposed in the flow supply line adjacent the source; and deductor mechanism interposed in the flow supply line downstream from said meter and comprising pump means having an inlet connected to the output of said flow meter, a supply chamber having a main inlet connected to the outlet side of said pump means, an outlet providing the sole supply to the point of use, and a secondary inlet connected to said return line adapted to return the total volume of recirculated flow passing through said return line to said supply chamber; and control means adapted to sense the flow volume in said supply chamber and effect operation of said pump means to establish a flow to said supply chamber from said source through said meter and said supply chamber main inlet only when the recirculated flow fails to maintain the flow volume at a predetermined volume in said supply chamber.

3. The apparatus of claim 2 wherein the flow meter comprises a plurality of measuring chambers of fixed, predetermined volumetric capacity, valve means actuatable to connect said measuring chambers to said fuel supply line for cyclically filling and emptying said measuring chambers into said flow supply line through said flow meter, photocell detecting means individual to each of said measuring chambers for sensing changes in the level of flow in each of said measuring chambers, a series of light beams directed one at each of said photocell means, and means associated with each measuring chamber including an element supported by and movable with the liquid in each measuring chamber for successively blocking said light beams to change the conductivity of said photocell detecting means and means actuated by said change of photocell conductivity for totalizing the number of light beam interruptions made by said elements as the flow in said measuring chambers is being discharged into said supply line.

4. The apparatus of claim 2 wherein said pump means comprises an electrically energized pump and said control means comprises a photo-electric sensor, an electric light source directing a light beam toward said sensor through a portion of said supply chamber, said supply chamber is provided with an element supported by and movable in response to the flow level in said supply chamber for blocking and unblocking said light beam as the level in said chamber changes to change the conductivity of said photo-electric sensor, and circuit means including an amplifier and relay actuated by said change in photocell conductivity for energizing said electric pump when the flow level falls below said predetermined level in said supply chamber to unblock said light beam and for deenergizing said electric pump when the flow level reaches said predetermined level in said supply chamber to block said light beam.

* * * * *